F. W. Lurmann.

Blast Furnace.

No. 3,204. Reissued Nov. 24, 1868.

WITNESSES:
Gustav Berg
Geo. F. Southard

INVENTOR:
F. W. Lurmann
by
Von Lindenthal & Hauff
attys.

United States Patent Office.

GEORGE ASMUS, OF NEW YORK, N. Y., ASSIGNEE OF F. W. LÜRMANN.

*Letters Patent No.* 70,447, *dated November* 5, 1867; *reissue No.* 3,204, *dated November* 24, 1868.

IMPROVEMENT IN BLAST-FURNACES.

The Schedule referred to in these Letters Patent and making part of the same.

*To all whom it may concern:*

Be it known that F. W. LÜRMANN, of Osnabrück, in the Kingdom of Prussia, have invented a new and useful Improvement in Blast-Furnaces; and I, GEORGE ASMUS, of the city, county, and State of New York, assignee of the said F. W. LÜRMANN, do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
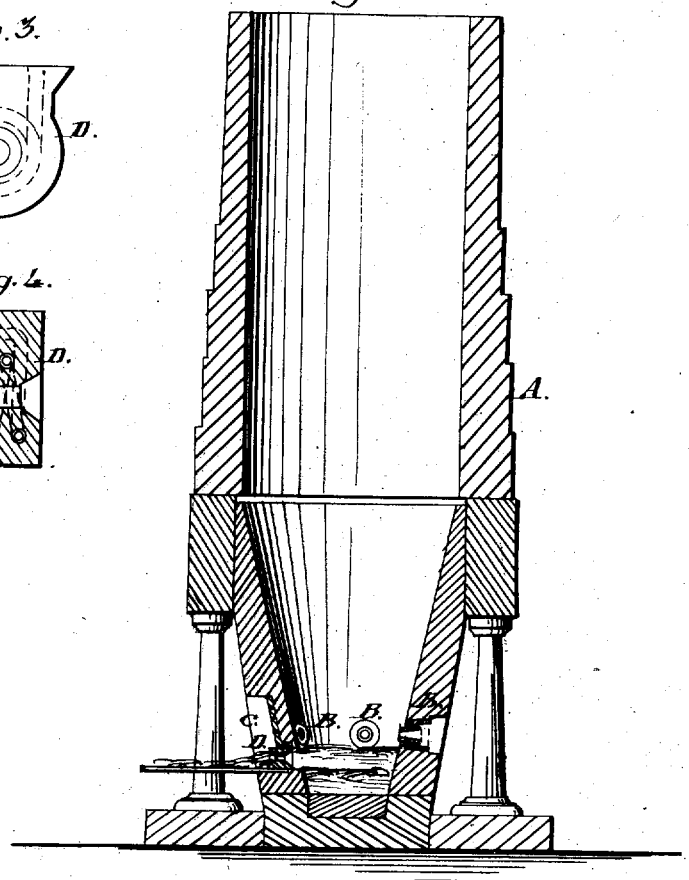
Figure 1 is a vertical central section of a furnace built according to this invention.

This invention relates to certain improvements in blast-furnaces with a closed breast: and It consists, principally, in a blast-furnace with a closed breast, where the slag is discharged through an opening cooled with water in such a manner that the tymp or fore-hearth and the wall-stone can be dispensed with, and that the slag can be tapped directly from the hearth.

It consists, further, in a slag-discharge piece or "cinder-block," of peculiar construction, as will be hereinafter more fully explained, whereby the building of a furnace according to this invention, and its correct operation, are materially facilitated.

In order to enable those skilled in the art to fully understand the object of this invention, I will first point out the disadvantages of blast-furnaces with a fore-hearth such as are now in common use for melting iron-ore.

In such furnaces the slag is driven out by first being forced below the tymp-stone, which projects below the level of the tuyeres, and intercepts the currents of air, and prevents their escape with the slag, which stands in the fore-hearth at the same level as on the hearth, the slag being discharged only when it rises in the fore-hearth high enough to overflow the top of the wall-stone that forms the bottom of the discharging-orifice.

By this arrangement the tymp-stone constitutes a trap, which intercepts the currents of air, and causes their pressure to be exerted directly on the surface of the slag on the hearth.

This method of construction has several disadvantages, one of which is the difficulty of keeping the tymp-stone and the surrounding parts in repair; another is that the pressure of the currents of air or wind is limited by the counter-pressure of the column of slag in the fore-hearth; and another is that one side of the furnace, being occupied by the fore-hearth, no tuyere can be applied on that side, and consequently the supply of wind is irregularly distributed.

By the improvement which constitutes the subject-matter of this present invention, these disadvantages are overcome in a simple and effective manner.

In the drawings, the letter A designates the furnace, and B several tuyeres, which are arranged therein at a proper height.

The furnace is constructed with a closed breast, and the sides of the hearth, whether round or square, extend clear down to the bottom stone, the usual opening (not shown in the drawing) being made in the lower part of the hearth for the discharge of the iron.

The openings for the tuyeres B are distributed at equal distances apart in the sides of the hearth.

Figure 3:
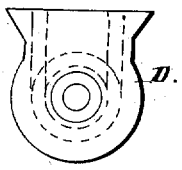
Figure 3 is a front elevation of the slag-discharge piece or cinder-block, detached.
Figure 4:
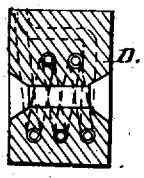
Figure 4 is a vertical section thereof.
Figure 2:
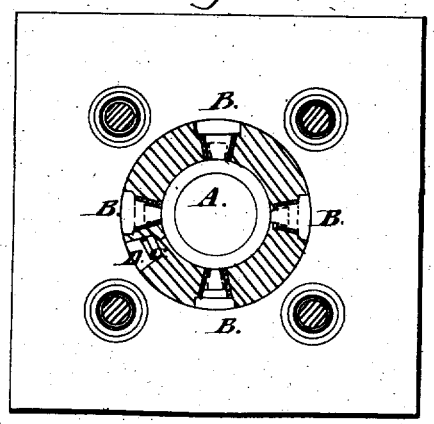
Figure 2 is a horizontal section through the tuyeres.

At a suitable height from the bottom stone an opening is left in the hearth, in which is placed a cast-iron or brass slag-discharge piece or cinder-block, D, which is cast or made with numerous channels or pipes, running up and down, or in other directions through it, as shown in figs. 3 and 4.

The cinder-block D may be formed with a dovetail on its upper end, which is fitted into the bottom of a stationary metallic plate, C, connected with the furnace, or it may be attached to said plate in any other desirable manner, or cast solid with the same, if desired.

The plate C is also cast or made with channels or pipes running through it, and the channels or pipes of said plate, and of the cinder-block D, may be so arranged as to connect or communicate with each other when the plate C and cinder-block D are in their proper position, or they may be independent of each other.

In the drawing, the plate C is shown above the cinder-block, but it may also be placed below, or in any other desirable position in relation to the same.

The object of the said channels or pipes is to permit the plate C and cinder-block D to be cooled by forcing water through them while the furnace is in operation, proper connections being made for that purpose with a reservoir of cold water, or with a force pump.

One or more holes are made in the cinder-block D, through which the slag is discharged, the shape of said holes being shown in figs. 3 and 4, the middle portion being cylindrical, but each end being conical or flaring.

The dimensions of the cinder-block are a little less than the opening in which it is placed, and the space left around it is filled with sand, which can be readily removed in case it is desired to remove the block D to repair it, or if it is desired to have an opening in the hearth to work through, as when any irregularity in the smelting-process has taken place.

The flow of the cooling-water through the cinder-block D is regulated for the purpose of controlling the discharge of the slag through it.

By allowing much cooling-water to circulate through its water-channels or pipes, the temperature of the block D is lowered sufficiently to allow a coating of slag to adhere and choke its discharge-openings, which are of less diameter in the middle than at their ends.

By reducing the flow of cooling-water, the cinder-block is allowed to retain a higher temperature, and, in consequence, the slag is melted out of the discharge-openings, and they become clear and open, and permit the slag to flow without interruption.

When the slag in the hearth is below the level of the discharge-openings, the latter are simply closed by an iron plug.

This invention can be easily applied, by those skilled in the art to which it belongs, to blast-furnaces of the common construction, by removing the fore-hearth and closing the aperture left in the breast of the furnace, under the tymp-stone, by inserting the plate C with the cinder-block D.

The principal advantages derived from this invention are as follows:

First, it permits a higher pressure of wind.

Second, the hearth is preserved in better condition than where the common mode of construction is retained.

Third, the labor of the operation of smelting is lessened.

Fourth, it allows one more side of the hearth for a tuyere.

Fifth, it avoids the stoppages of the wind-supply, now necessary as often as the iron is discharged.

Sixth, a considerable increase is gained in the product of the furnace, while at the same time the cost of labor and repairs is lessened.

Having thus described this invention,

What I claim as new, and desire to secure by Letters Patent, is—

1. A blast-furnace with a closed breast where the slag is discharged through an opening or openings cooled by water, substantially as set forth.

2. The slag-discharge piece or cinder-block D, constructed and arranged substantially as described.

3. The cinder-block D, in combination with the plate C, to which it is attached, substantially as described.

4. The shape of the discharge-opening or openings of the cinder-block D, being made flaring at its ends, and of diminished diameter in the middle or central part, substantially as described.

5. The combining of the slag-discharge piece or cinder-block with a series of water-channels or pipes, substantially as and for the purpose above set forth.

6. Combining with the metallic plate C a series of water-channels or pipes, substantially as and for the purpose set forth.

7. The method of controlling the discharge of slag from blast-furnaces by regulating the temperature of the slag-discharge piece or cinder-block, substantially as described.

This specification signed by me, this 24th day of October, 1868.

GEORGE ASMUS.

Witnesses:
W. HAUFF,
ERNEST F. KASTENHUBER.